US006685003B2

(12) United States Patent
Copeland et al.

(10) Patent No.: US 6,685,003 B2
(45) Date of Patent: Feb. 3, 2004

(54) PULSE-FREE ESCALATOR

(75) Inventors: George Scott Copeland, Wethersfield, CT (US); Timothy P. Galante, Middletown, CT (US); Richard N. Fargo, Plainville, CT (US); Robert M. Hammell, Killingworth, CT (US)

(73) Assignee: Otis Elevator Company, Farmington, CT (US)

( * ) Notice: Subject to any disclaimer, the term of this patent is extended or adjusted under 35 U.S.C. 154(b) by 0 days.

(21) Appl. No.: 10/034,400

(22) Filed: Dec. 28, 2001

(65) Prior Publication Data

US 2003/0121756 A1 Jul. 3, 2003

(51) Int. Cl.[7] ......................... B66B 21/00; B66B 21/02; B66B 23/16; B65G 23/24

(52) U.S. Cl. ........................................ 198/326; 198/329

(58) Field of Search ................................. 198/326, 327, 198/332, 329

(56) References Cited

U.S. PATENT DOCUMENTS

| | | | | |
|---|---|---|---|---|
| 3,314,526 A | | 4/1967 | Franek et al. | |
| 4,130,192 A | * | 12/1978 | Kraft | 198/327 |
| 4,588,065 A | * | 5/1986 | Maiden et al. | 198/323 |
| 5,829,570 A | * | 11/1998 | Kwon | 198/326 |
| 5,890,578 A | * | 4/1999 | Kwon | 198/332 |
| 5,899,314 A | * | 5/1999 | Kwon | 198/332 |

FOREIGN PATENT DOCUMENTS

| | | |
|---|---|---|
| DE | 2749407 | 5/1979 |
| DE | 19849236 A1 | 2/2000 |

OTHER PUBLICATIONS

"Toward A More Exact Kinematics Of Roller Chain Drives", By C–K Chen and F. Freudenstein, Journal of Mechanisms, Transmissions, and Automation in Design, 110:269–275, Sep. 1988.

Polygonal Action In Chain Drives, By S. Mahalingam, Journal of the Franklin Institute, vol. 265, No. 1, pp. 23–28, 1958.

"Automated Dynamic Analysis of Chain–Driven Mechanical Systems", By Ting W. Lee, Journal of Mechanics, Transmission, and Automation and Design, vol. 105, pp. 362–370, Sep. 1983.

"A Super High–Rise Escalator With A Horizontal Mid–Section", By Yasumasa Haruta et al., Elevator Technology 6, Proceedings of ELEVCON '95, Mar. 1995, Hong Kong, pp. 78–87.

* cited by examiner

*Primary Examiner*—Gene O Crawford
(74) *Attorney, Agent, or Firm*—Bachman & LaPointe, P.C.

(57) ABSTRACT

A pulse free escalator system has two spaced apart pulse free turnaround sections and at least one pulse-free transition zone. A method of designing the turnaround sections and the at least one transition zone is described herein. The escalator system has a pair of guide tracks and a pair of linkage assemblies, each comprising a plurality of links joined together. Each linkage assembly has a plurality of rollers for supporting the linkage assembly which travel in a respective one of the guide tracks. Each guide track has two spaced apart turnaround portions with each turnaround portion defining a travel path for each roller having a linear entry section, a linear exit section, and a pulse-free section intermediate the two sections.

10 Claims, 2 Drawing Sheets

PULSE-FREE ESCALATOR

BACKGROUND OF THE INVENTION

The present invention relates to an escalator system having pulse-free turnarounds and transition zones and a method for designing the escalator system.

The step assembly of an escalator forms a chain of rigid links. The links are supported by rollers which move around a smooth closed track. At the top and bottom of the escalator, the tracks "turn around", reversing the direction of travel. Typically, the velocity of the step entering the turnaround differs from the velocity of the step having exited the turnaround. This is experienced as a cyclical velocity pulsation at the link passage frequency. As part of this experience, the rollers may periodically lift off the track or the joints and rollers may be subject to excessive loads alternately binding and stretching. This "polygon-effect" vibration can result in unacceptable ride quality. The same effect can occur to a lesser degree in the transition regions between the escalator rise and the upper and lower landings.

Polygon-effect vibration is typically addressed by defining roller paths with sufficiently large radii for turnarounds and transitions. Haruta et al., in the article "A Super High-Rise Escalator With a Horizontal Mid-Section", *Elevator Technology* 6, Proceedings of ELEVCON '95, March 1995, pp. 78–87, describe a design method for choosing optimal constant radii for minimization of the polygon effect. Despite the existence of this design method, there remains a need for a design method and an escalator which has a truly pulse-free turnaround.

SUMMARY OF THE INVENTION

Accordingly, it is an object of the present invention to provide an escalator system which has pulse-free turnarounds.

It is another object of the present invention to provide an escalator system as above having pulse-free transition zones.

It is a further object of the present invention to provide a method for designing an escalator system having pulse-free turnarounds and/or pulse-free transition zones.

The foregoing objects are attained by the escalator system and the design method of the present invention.

In accordance with the present invention, an escalator system is provided which broadly comprises a pair of guide tracks, and a pair of linkage assemblies each comprising a plurality of links joined together. Each linkage assembly has a plurality of rollers for supporting the linkage assembly, which rollers travel in a respective one of the guide tracks. Each guide track has two spaced apart turnaround portions with each turnaround portion defining a travel path for each roller having a linear entry section, a linear exit section, and a curved pulse-free section. The escalator system may further have at least one pulse-free transition zone.

Further, in accordance with the present invention, a method for designing an escalator system broadly comprises designing each turnaround to be pulse-free by selecting a trajectory to connect two linear sections, determining a number of links which fit the selected trajectory, determining an initial configuration for the links where a first joint associated with a first one of the links travels in a linear direction and a second joint associated with a last one of the links travels in a linear direction; and determining a trajectory of a third joint located between the first and second joints as the third joint passes through the turnaround section. The method further comprises designing at least one pulse-free transition zone.

Other details of the pulse free escalator system and design method of the present invention, as well as other objects and advantages attendant thereto, are set forth in the following detailed description and the accompanying drawings, wherein like reference numerals depict like elements.

DETAILED DESCRIPTION OF THE PREFERRED EMBODIMENT(S)

Figure 1:
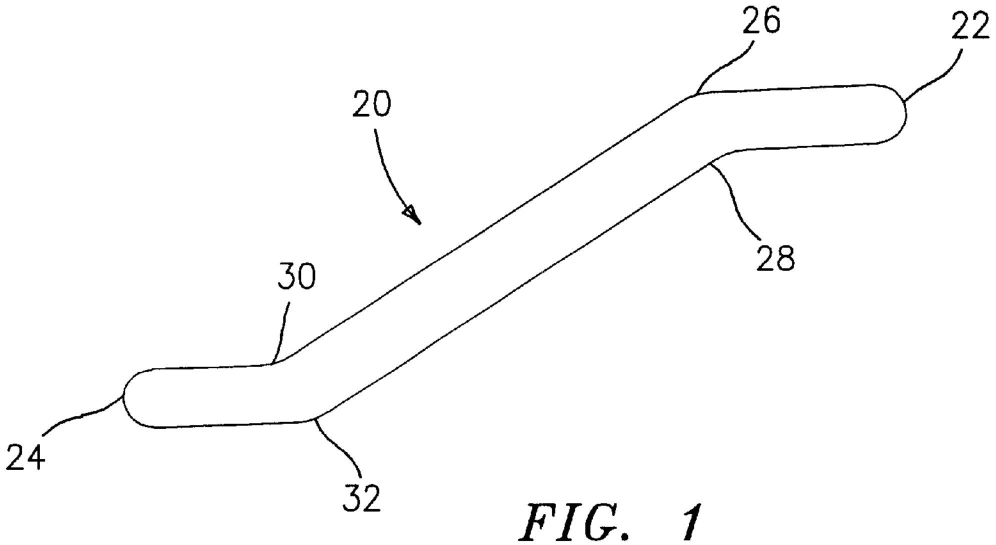
FIG. 1 is a schematic representation of a roller path for an escalator system showing transition and turnaround regions.

As discussed above, the present invention relates to an escalator system 10 having pulse free turnaround and/or transition sections. As used herein, the term "pulse-free" means that if the links in one straight section are moving at a constant rate, the links in the return section move at the same constant rate. Pulse-free allows both sides to have the same constant velocity. The escalator system 10 includes a pair of spaced apart guide tracks 12, and a pair of spaced apart link assemblies 14 for supporting a plurality of steps (not shown). Each link assembly 14 includes a plurality of links 16 joined together by pins or the like. Each link 16 has at least one roller 18 for engaging a respective one of the guide tracks 12 and for following the path defined by the respective guide track 12. A typical guide path 20 for each roller 18 is shown in FIG. 1. As shown therein, the guide path 20 includes first and second spaced apart turnaround portions 22 and 24 and four transition sections 26, 28, 30, and 32. Any suitable conventional drive system known in the art may be used to drive the link assemblies 14 and hence the rollers 18.

Figure 2:
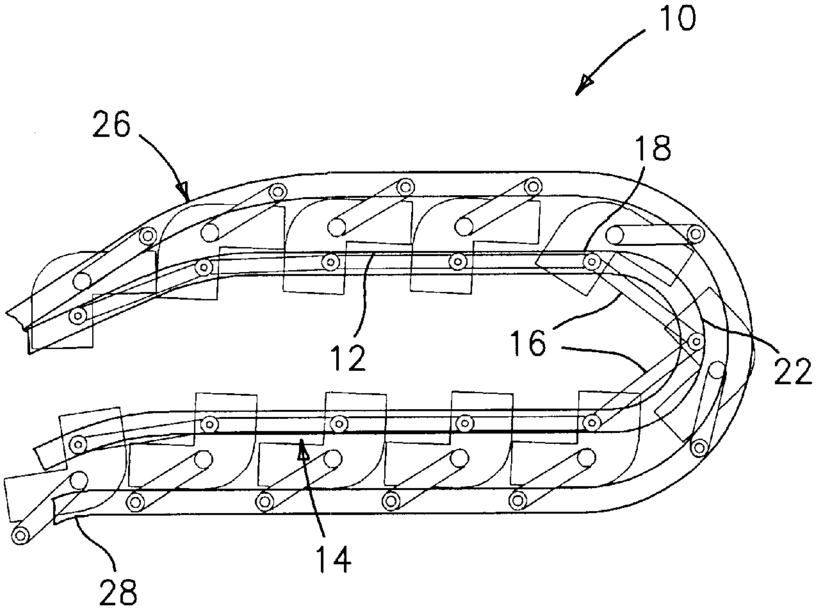
FIG. 2 is a side view of a turnaround section of a track system used in the escalator system of FIG. 1.

Referring now to FIG. 2 of the drawings, a portion of one of the guide tracks 12 is illustrated. It should be recognized that the guide track 12 on the opposite side of the escalator 10 has the same construction and has the same relationship of guide track, rollers, and links. The guide track portion shown in FIG. 2 includes turnaround portion 22 and transition sections 26 and 28. As can be seen in this figure, a plurality of rollers 18 attached to links 16 travel along the guide path defined by the guide track 12 which is entirely closed, particularly in the turnaround portion 22.

Figure 3:
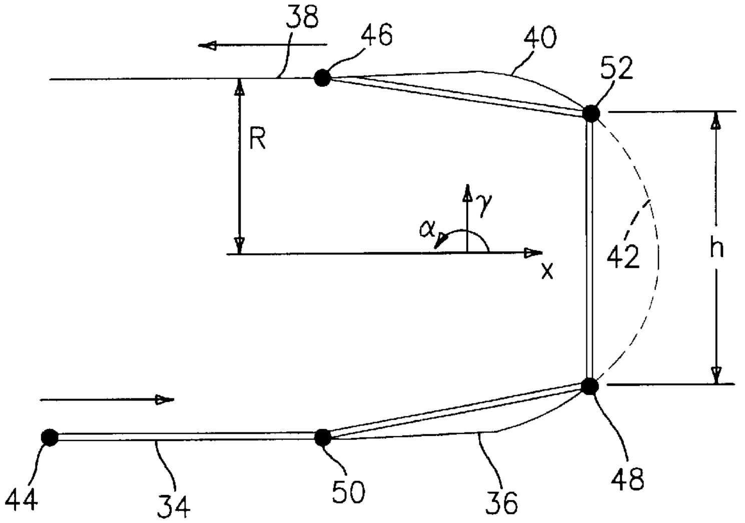
FIG. 3 is a schematic representation of a four bar linkage going through a turnaround section of a track in accordance with the present invention.
Figure 4:
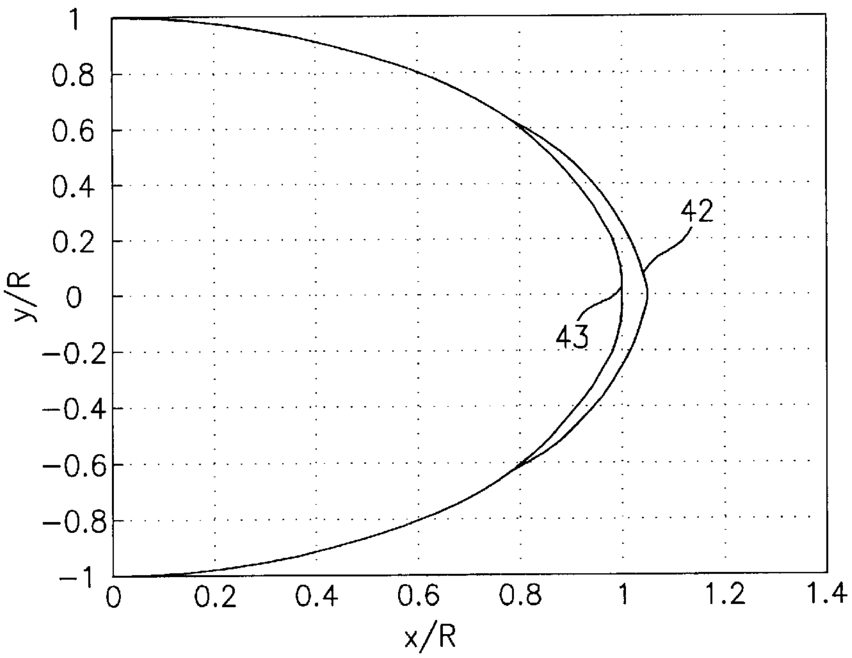
FIG. 4 is a graph comparing a conventional constant radius roller path with a pulse-free roller path in accordance with the present invention.

In order for the turnaround portion 22 to be pulse free, the speed of the link exiting the turnaround portion 22 must be the same as the speed of the link entering the turnaround portion 22. Such a pulse-free turnaround portion is shown in FIG. 3. As shown therein, the pulse free turnaround portion 22 has a linear entry section 34, a first known trajectory section 36 adjacent the linear section 34, a linear exit section 38, and a second known trajectory section 40 adjacent the linear exit section 38. The first and second known trajectory sections 36 and 40 may have any desired configuration. For example, each of the sections 36 and 40 may be constant radius curved sections having a radius R. Alternatively, the sections 36 and 40 may have different curved configurations. The pulse-free turnaround portion 22 exemplified in FIG. 3 also has a pulse free section 42 intermediate the constant radius sections 36 and 40. As shown in FIG. 4, the pulse free section 42 does not have a constant radius curvature as shown by curve 43.

While the pulse-free section 42 has been shown as being located between the two known trajectory sections 36 and 40, it does not have to be located between these sections. The pulse-free section 42 can be anywhere along the turnaround portion 22. For example, it could be adjacent one of the linear sections 36 and 38. Also, the pulse-free section 42 does not have to be symmetric with respect to any axis such as the horizontal axis "x" or the vertical axis "y". Still further, the pulse free section 42 could extend from the linear section 34 to the linear section 38.

While the linear sections 34 and 38 have each been shown as being horizontal, they could be inclined at an angle relative to the horizontal axis "x".

To determine the curvature for the pulse free section 42, one first selects a fixed trajectory for connecting the two linear sections 34 and 38 and then determines the number of links 16 which fit the selected trajectory. Thereafter, one determines an initial configuration for the links 16. The initial configuration may be symmetric or non-symmetric. The configuration must be such however that the first and last joints 44 and 46 between the links 16 travel in a straight line. The trajectory of a selected third joint passing through the turnaround portion 22 is the curve which defines the curvature of the pulse free section 42. The selected third joint, if desired, may be a central joint such as joint 48 in FIG. 3.

The trajectory of the selected third joint 48 may be computed as follows: (1) the first and last joints 44 and 46 are displaced an equal amount consistent with a zero pulsation requirement; (2) the coordinates of two other joints, such as joints 50 and 52 in a system having at least four links are determined successively from the constraints that their paths are known and that they must be a distance h (the length of each link) from the adjacent, previously located joint; and (3) the path of the selected third joint, such as joint 48, is determined using the requirement that it must be located at a distance h from the two other joints.

To illustrate the method of the present invention, the following example is presented. This example is consistent with the turnaround portion of an escalator system with $1 \leqq h/R \leqq 2$ where h is the length of each link and R is the radius of two constant radius sections 36 and 40. This symmetric configuration is shown in FIG. 3. At least four links are required for the analysis, hence the central joint is the third joint 48. In this case, the direction of travel at entry is in the positive x direction and the direction of travel at the exit is in the negative x direction, hence $\alpha$, which is the displacement angle, is equal to $\pi$ or 180 degrees. The displacement of the first joint 44 along the path of travel is given by s. As s increases from 0 to h, first joint 44 moves along the path to the initial position of joint 50, joint 50 moves along the path to the initial position of joint 48, and so on. The objective of the design method of the present invention is to determine the coordinates along the x and y axes of the third or central joint 48. These coordinates may be expressed as $x_{48}(s)$ and $y_{48}(s)$.

Initially, the joint coordinates in the symmetric configuration are determined. These coordinates may be expressed as:

$$x_{52}(0)=\sqrt{R^2-h^2/4}\quad y_{52}(0)=h/2$$

$$x_{46}(0)=x_{52}(0)-\sqrt{h^2-(R-h/2)^2}\quad y_{46}(0)=R$$

$$x_{48}(0)=x_{52}(0) y_{48}(0)=-y_{52}(0)$$

$$x_{50}(0)=x_{46}(0) y_{50}(0)=-y_{46}(0)$$

$$x_{44}(0)=x_{46}(0)-h y_{44}(0)=y_{50}(0)$$

The pulse-free condition requires equal displacements of the joints 44 and 46 in the positive and negative x directions respectively. Hence, $$x_{44}(s)=x_{44}(0)+s y_{44}(s)=y_{44}(0)$$

$$x_{46}(s)=x_{46}(0)-s y_{46}(s)=y_{46}(0)$$

Joint 50 is required to move along a known path and remain a distance h from joint 44. These two constraints may be solved for the coordinates $x_{50}(s)$ and $y_{50}(s)$ in the following manner:

if $$s \leqq -x_{50}(0),$$

$$x_{50}(s)=x_{50}(0)+s y_{50}(s)=y_{50}(0)$$

else, $$[x_{50}(s)-x_{44}(s)]^2+[y_{50}(s)-y_{44}(s)]^2=h^2$$

$$x_{50}^2(s)+y_{50}^2(s)=R^2$$

$$x_{50}(s)>0$$

Similarly, constraints hold for the coordinates of joint 52, $x_{52}(s)$ and $y_{52}(s)$, if $$s>x_{48}(0)+h,$$

$$x_{52}(s)=x_{48}(s)+h\quad y_{52}(s)=y_{48}(0),$$

else, $$[x_{48}(s)-x_{52}(s)]^2+[y_{48}(s)-y_{52}(s)]^2=h^2$$

$$x_{52}^2(s)+y_{52}^2(s)=R^2$$

$$x_{52}(s)>0$$

The coordinates of joint 48, which specify the curve for the pulse-free change of direction and thus for the section 42, are then given by the better of the two solutions for the equations:

$$[x_{52}(s)-x_{48}(s)]^2+[y_{52}(s)-y_{48}(s)]^2=h^2$$

$$[x_{48}(s)-x_{50}(s)]^2+[y_{48}(s)-y_{50}(s)]^2=h^2$$

The methodology described hereinbefore can be used to derive the curvature of a pulse-free section 42 for a system having any number of links.

While the pulse-free section 42 may be located between two constant radius curved sections 36 and 40, the pulse-free section 42 could be located elsewhere in the turnaround portion 22. For example, it could be located between one of the linear sections and one of the constant radius curved sections. Still further, it could be located between two non-linear, non-constant radius sections. Yet further, the turnaround portion 22 may have only one constant radius section with the other section being a non-constant radius section.

Figure 5:
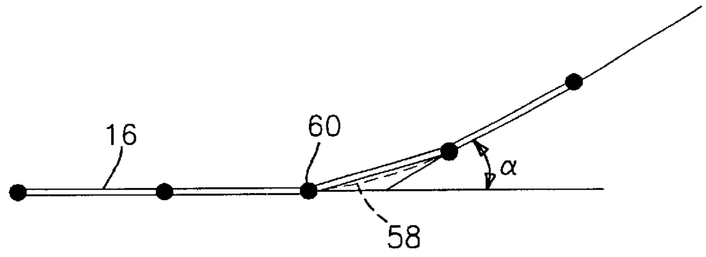
FIG. 5 is a schematic representation of a pulse free transition zone for an escalator system.

In some escalator systems, it may be desirable to have pulse-free transition zones 26, 28, 30 and 32. FIG. 5 shows a typical escalator transition region with $h/R<2 \sin(\alpha/2)$. If one uses at least four links 16 for the analysis, as before, a curve 58 for pulse-free transition is given by the trajectory of an interior joint 60, $x_{60}(s)$ and $y_{60}(s)$. In this illustration, the direction of travel at entry is in the positive x direction and the direction of travel at the exit is upwards at an inclination of 30 degrees, hence $\alpha=\pi/6$. The method for designing each pulse-free transition zone comprises selecting a trajectory to connect two linear sections adjacent the transition zone, determining a number of links which fit the selected trajectory, determining an initial configuration for the links wherein a first joint associated with a first one of the links travels in a linear direction and a second joint associated with a last one of the links travels in a linear direction, and determining a trajectory of a third joint located between the first and second joints as the third joint passes through the transition zone.

While the design methods of the present invention have been described as using four links, the methods could use less than four links or more than four links to design the pulse-free turnaround and transition sections.

It is apparent that there has been provided in accordance with the present invention a pulse-free turnaround for escalators which fully satisfies the objects, means and advantages set forth hereinbefore. While the present invention has been described in the context of specific embodiments thereof, other alternatives, modifications, and variations will become apparent to those skilled in the art having read the foregoing description. Therefore, it is intended to embrace those alternatives, modifications, and variations as fall within the broad scope of the appended claims.

What is claimed is:

1. A pulse free escalator system comprising:

a pair of guide tracks;

a pair of linkage assemblies each comprising a plurality of links joined together;

each said linkage assembly having a plurality of rollers for supporting said linkage assembly, said rollers travelling in a respective one of said guide tracks;

each said guide track having two spaced apart pulse-free turnaround portions; and each said pulse-free turnaround portion defining a travel path for each roller having a linear entry section, a linear exit section, and a curved pulse-free section located between said sections.

2. An escalator system according to claim 1, wherein said turnaround portion has a first section with a known trajectory and a second section with a known trajectory and said curved pulse-free section is located between said first and second sections and has a curvature different from said first and second sections.

3. An escalator system according to claim 2, wherein at least one of said first and second sections is a constant radius section.

4. An escalator system according to claim 3, wherein said turnaround portion has two radius sections each having the same radius of curvature.

5. An escalator system according to claim 1, wherein each said guide track in each said turnaround section is a closed track defining a closed path for said rollers.

6. A pulse free escalator system comprising:

a pair of guide tracks;

a pair of linkage assemblies each comprising a plurality of links joined together;

each said linkage assembly having a plurality of rollers for supporting said linkage assembly, said rollers travelling in a respective one of said guide tracks;

each said guide track having two spaced apart turnaround portions;

each said turnaround portion defining a travel path for each roller having a linear entry section, a linear exit section, and curved pulse-free section located between said sections;

each said link assembly having at least four links in each said turnaround section and said at least four links having at least five joints associated therewith and said curvature of said pulse free section corresponding to a trajectory of a selected one of said joints and said selected joint having coordinates given by the equations:

$$[x_{52}(s)-x_{48}(s)]^2+[y_{52}(s)-y_{48}(s)]^2=h^2$$

$$[x_{48}(s)-x_{50}(s)]^2+[y_{48}(s)-y_{50}(s)]^2=h^2$$

wherein $x_{52}(s)$ is a displacement a fourth one of said joints along an x-axis, $x_{48}(s)$ is a displacement of said selected joint along said x-axis, $x_{50}(s)$ is a displacement of a second one of said joints along said x-axis, $y_{52}(s)$ is a displacement of said fourth joint along a y-axis perpendicular to said x-axis, $y_{50}(s)$ is a displacement of said selected joint along said y-axis, $y_{48}(s)$ is a displacement of said second joint along said y-axis, s is the displacement of a first one of said joints along a path of travel, and h is a length of each said link.

7. A pulse free escalator system comprising:

a pair of guide tracks;

a pair of linkage assemblies each comprising a plurality of links joined together;

each said linkage assembly having a plurality of rollers for supporting said linkage assembly, said rollers travelling in a respective one of said guide tracks;

each said guide track having two spaced apart turnaround portions;

each said turnaround portion defining a travel path for each roller having a linear entry section, a linear exit section, and curved pulse-free section located between said sections; and a plurality of transition sections and each said transition section being pulse free.

8. A method for designing a pulse-free escalator system comprising the steps of:

designing each turnaround section to be pulse-free; and said designing step comprising selecting a trajectory to connect two linear sections, determining a number of links which fit the selected trajectory, determining an initial configuration for said links wherein a first joint associated with a first one of said links travels in a linear direction and a second joint associated with a last one of said links travels in a linear direction, and determining a trajectory of a third joint located between said first and second joints as said third joint passes through said turnaround section.

9. A method according to claim 8, wherein said third joint trajectory determining step comprises displacing said first and second joints an equal distance, determining coordinates along a first axis and along a second axis perpendicular to said first axis for a fourth joint positioned between said first joint and said third joint and a fifth joint positioned between said third joint and said second joint as a result of said displacing step, and determining coordinates along said first and second axes for said third joint as a result of said displacement of said fourth and fifth joints.

10. A method according to claim 8, further comprising:

designing said escalator system to have at least one pulse-free transition zone; and said transition zone designing step comprising selecting a trajectory to connect two further linear sections adjacent said at least one pulse-free transition zone of said escalatory system, determine a number of links which fit the selected trajectory, determining an initial configuration for said links wherein a first joint associated with a first one of said links travels in a linear direction and a second joint associated with a last one of said links travels in a linear direction, and determining a trajectory of a third joint located between said first and second joints as said third joint passes through said at least one transition zone.

* * * * *

UNITED STATES PATENT AND TRADEMARK OFFICE

CERTIFICATE OF CORRECTION

PATENT NO. : 6,685,003 B2
DATED : February 3, 2004
INVENTOR(S) : George Scott Copeland et al.

It is certified that error appears in the above-identified patent and that said Letters Patent is hereby corrected as shown below:

<u>Column 6,</u>
Line 27, delete “selected” and insert -- second --.
Line 28, delete “second” and insert -- selected --.

Signed and Sealed this

Twenty-eighth Day of February, 2006

JON W. DUDAS
*Director of the United States Patent and Trademark Office*